Figure 1:
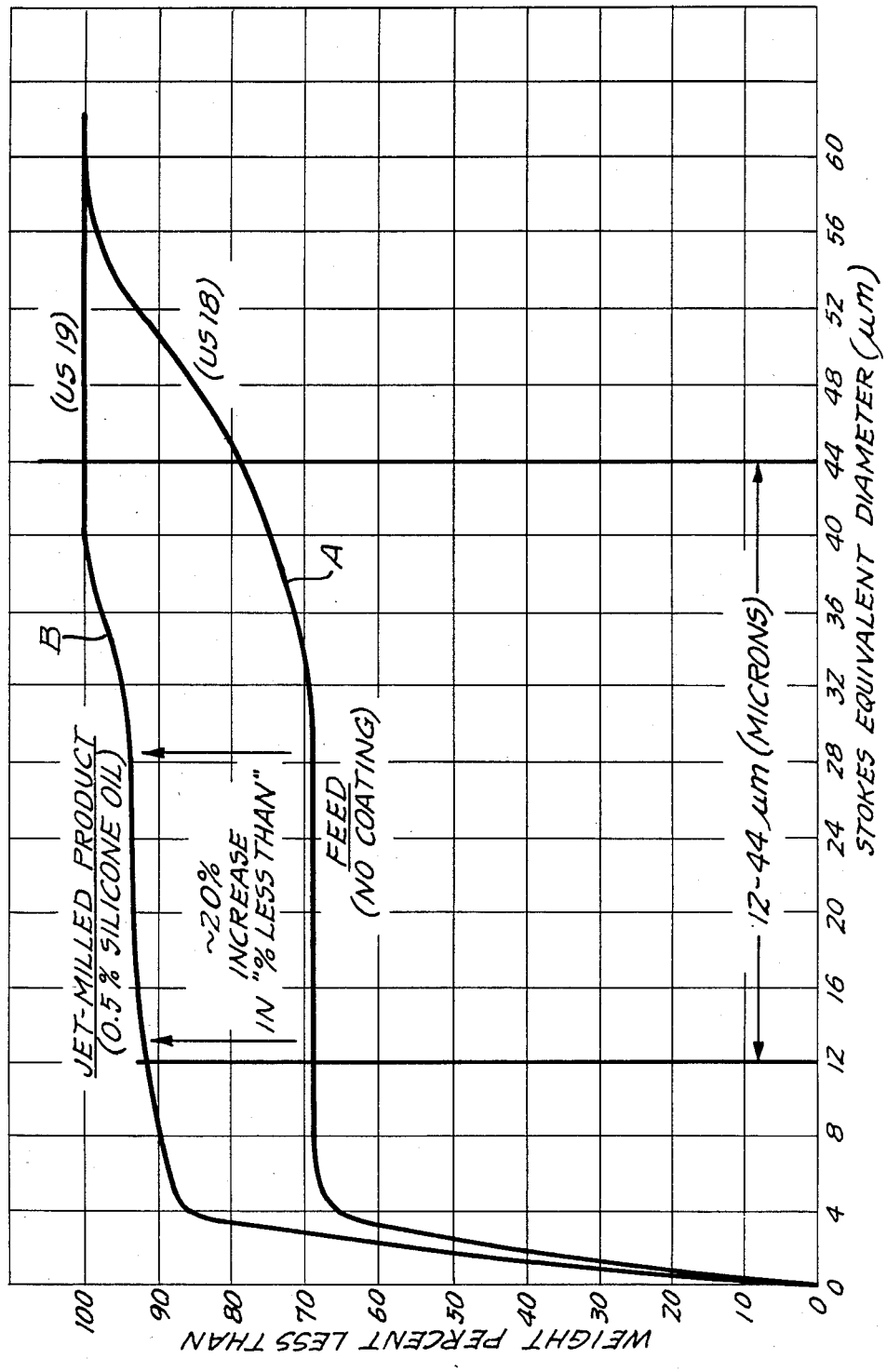

United States Patent [19]

Hatt

[11] Patent Number: 4,722,952

[45] Date of Patent: Feb. 2, 1988

[54] RESIN COMPOSITIONS

[75] Inventor: Brian W. Hatt, Speen, England

[73] Assignee: Elkem a/s, Oslo, Norway

[21] Appl. No.: 861,187

[22] Filed: May 9, 1986

[51] Int. Cl.$^4$ .............................................. C08K 3/36
[52] U.S. Cl. .................................... 523/216; 523/212; 523/213; 524/492; 524/493
[58] Field of Search ....................... 523/212, 213, 216; 524/492, 493

[56] References Cited

U.S. PATENT DOCUMENTS

| | | | |
|---|---|---|---|
| 3,013,897 | 12/1961 | Cupery et al. | 524/493 |
| 3,574,135 | 4/1971 | Sampson et al. | 524/493 |
| 3,622,650 | 2/1969 | Berstein | 524/493 |
| 3,720,532 | 3/1973 | Simpson et al. | 106/308 Q |
| 4,301,060 | 11/1981 | Underwood et al. | 524/492 |
| 4,455,331 | 6/1984 | Barsotti | 524/493 |
| 4,515,861 | 5/1985 | Arup | 428/450 |

FOREIGN PATENT DOCUMENTS 1162786  8/1969  United Kingdom .
1394910  5/1975  United Kingdom .

*Primary Examiner*—Lewis T. Jacobs
*Attorney, Agent, or Firm*—Lucas & Just

[57] ABSTRACT

Silica fume subject to a mechanical reduction in size by a milling process such as a fluid energy mill or jet mill is disclosed. The overall size reduction is at least 10%. The milled silica fume product should have not more than 0.5% by weight unable to pass through a 325 mesh screen. The milled silica fume can be used in thermoplastic resins, cementitious material and refactory material. The use of the milled silica fume with UPVC or PVC to make conduit with improved elastic modulus, improved impact resistance, decreased wall thickness and increased calcium carbonate content is specifically disclosed.

22 Claims, 1 Drawing Figure

RESIN COMPOSITIONS

This invention relates to new and improved resin compositions and more particularly to thermoplastic resin compositions such as a polyvinyl chloride composition and a process for making conduit therefrom.

It is well known to extrude pipe such as sewer pipe and telephone, power and communication conduits from thermoplastic resins. Conventional polyvinyl chloride compositions used in the extrusion process usually contain the following ingredients:

1. A thermal stabilizer such as a basic lead or tin compound;
2. An internal lubricant such as calcium stearate;
3. An external lubricant such as paraffin wax;
4. A pigment such as carbon black or titanium oxide;
5. A filler such as calcium carbonate; and
6. An impact strength modifier for some applications.

A filler is used to decrease the cost of the composition. However, the addition of large amounts of filler also decreases the impact strength of the conduit, making the addition of an impact strength modifier essential for some products.

It has now been discovered that by adding to a thermoplastic resin composition a silica fume which has been subject to fluid energy milling an improved conduit can be formed.

It has been found in using the composition of the present invention that:

1. the elastic modulus of pipe made with the present invention is greater than conventional pipe;
2. the impact strength of pipe made with the present invention is greater than conventional pipe;
3. the wall thickness of pipe made with the present invention can be decreased compared to conventional pipe thus decreasing the overall cost of the pipe while still maintaining the impact strength and pipe stiffness required by the appropriate product specifications;
4. the amount of calcium carbonate used as a filler in the present invention can be increased thus decreasing the overall price of the pipe while still producing a pipe having an impact strength greater than or equal to conventional pipe; and
5. the volumetric output rate of the extruder is increased when the composition of the present invention is used as compared to conventional compositions used to extrude pipe.

The amount of milled silica fume added to the thermoplastic resin composition is about 0.5 to 40 phr. (parts by weight based on 100 parts of resin). Good results have been obtained with the addition of about 5 to 30 phr. and best results are obtained with the addition of about 5 to 25 phr. A good commercial thermoplastic resin composition for extruding conduit contains about 10 phr. milled silica fume.

The term thermoplastic resin used in the specification and claims includes not only thermoplastic resins per se, but also mixtures thereof, as well as a blend of thermoplastic resin with another material such as an elastomer like nitrile rubber. The so-called thermoplastic rubbers, thermoplastic elastomers are also included in the definition of thermoplastic resin. Thermoplastic resins per se include polyolefins, polystyrene, polyesters, ABS copolymers, polyvinyl chloride (PVC), unplasticized polyvinyl chloride (UPVC) and acrylic polymers.

The term silica fume used in the specification and claims means silica fume which is particulate amorphous silica obtained from a process in which silica is reduced and the reduction product is oxidized in vapor phase to form amorphous silica.

FIG. 1 illustrates the overall size reduction between milled silica fume and unmilled silica fume.

In a preferred embodiment the silica fume of present invention is obtained as a by-product in the production of silicon metal or ferrosilicon in an electric reduction furnace. In these processes, fairly large quantities of silica are formed as dust. The dust is recovered in conventional manner using filters or other collection apparatus.

The manufacture of silicon involves the reduction of silica such as quartz with carbon. Iron is added if the alloy ferrosilicon is desired. Part of the reduced silica as it is leaving the furnace, is reoxidized in the vapor phase to form fine particulate silica.

The silica fume particles may contain at least 86% by weight silica ($SiO_2$) and have a real density of 2.1-2.3 $g/cm^3$ and a surface area of 15-30 $m^2/g$. The primary particles are substantially spherical and at least 60% by weight of the fume has a primary particle size of less than 1 micron ($\mu m$) Many of the primary particles are combined together to form agglomerates which have dimensions of about 1 $\mu m$ and greater. These values may of course be varied. The $SiO_2$ content may be varied and the particle size selected by screening or classification. The particles are generally gray due to carbon. If desired, the carbon may be burned off to form white particles.

In accordance with the present invention, silica fume is subjected to fluid energy milling prior to its addition into a composition of thermoplastic resin.

Fluid energy mills or jet mills hereinafter referred to collectively in both the specification and claims as fluid energy mills are conventional pieces of equipment and generally classified into two categories. Both utilize an inert fluid stream such as air, nitrogen or steam to convey the particles to the mill. In one category, the stream of particles is admitted at an angle around the periphery of a grinding and classifying chamber. In another category two streams enter into the chamber and impact upon each other. Both categories of mills utilize the high turbulence of the fluid inside the chamber to grind the particles upon themselves which reduces the overall size of the particles.

Brand names and manufacturers of fluid energy mills include: a Trost Mill made by Garlock Plastomer Products; Micro-Jet, Jet-o-Mizer, and Angle Mill made by Fluid Energy Processing and Equipment Co.; Micronizer made by Sturtevant Mill Corp.; and Majac Jet Pulverizer made by Majac, Inc.

The fluid energy mill is operated in a conventional manner.

The silica fume can be coated before, after or during the milling process. Coating of the silica fume either before or after the milling process is accomplished in a conventional manner such as in a drum mill.

It has also been discovered that coating can be accomplished during the milling process 'in situ' by adding the coating material to the fluid inlet stream of the mill either before or after the addition of silica fume. When in situ coating is performed, it is preferred that the coating material be added at a point in the inlet stream ahead of the silica fume such that the silica fume enters a fluid stream containing the coating material.

When the milled silica fume is to be coated, it is preferred to coat the silica fume in situ.

Suitable coating materials include hydrogenated castor oil, silicone oils such as polydimethylsiloxane, trimethylolpropane, hexamethyldisilazane, pentaerythritol and butyl stearate. Silicone oils are preferred.

The amount of coating material to use is conventional and can be varied depending on the needs of the individual user. Satisfactory results are obtained with about 0.5 to 1.0% by weight based on the silica fume fed to the mill.

The milled silica fume is collected in a conventional manner such as a bag house.

It will be appreciated by those of skill in the art that measuring particles in the submicron range is extremely difficult and there are many methods for measuring particles in this size range. Photon correlation spectroscopy, sedimentation, centrifugal particle size distribution analysis and scanning electron microscopy are a few such methods. Centrifugal particle size distribution analysis has been found to provide reproducible results and the results reported in FIG. 1 have been obtained by such a method, using a model CAPA-500, Horiba manufactured and sold by Horiba Instruments Inc.

FIG. 1 discloses two graphs, the graph marked A shows a typical curve for the unmilled silica fume. The graph marked B is a typical graph of milled silica fume which has been coated in situ with 0.5% silicone oil in accordance with the present invention.

The graphs in FIG. 1 show the overall size reduction in accordance with the present invention. The vertical difference between the two graphs at any one point along the horizontal axis gives the overall size reduction. For example, the unmilled silica fume of graph A has about 70% by weight of the particles with a diameter of less than 12.0 μm, whereas the milled silica fume of graph B has about 90% by weight with a diameter of less than 12.0 μm. This is a 20% reduction in overall size. It is preferred that overall reduction in size from the unmilled silica fume to the milled silica fume is at least about 10% and more, preferably at least about 15%. Best results are obtained with a size reduction of at least about 20%. The values of 10, 15 and 20% are measured in the range of between about 12 to about 44 μm.

The measurements made in FIG. 1 were made using a Horiba model CAPA-500 centrifugal particle size distribution analyzer. The technique employed was that as outlined in the operations manual provided with the instrument, Manual No. 090969A published June 1985 by Horiba Instruments Inc. The samples for both the feed and the milled product were prepared by dispersing 5 grams of the silica fume either milled or unmilled in 50 cm$^3$ of an aqueous ethanol solution with a high shear blender for one minute. The aqueous ethanol solution comprises 96% by weight of ethanol and 4% by weight of water. From this solution, a 0.3 cm$^3$ sample was withdrawn and placed in another 50 cm$^3$ of a 96% ethanol solution. This second solution was blended for one minute and then treated for 0.5 minutes in an ultrasonic bath to remove air bubbles. This sample was cooled to 25° C. prior to transferring a sample to the measuring cell of the instrument.

The effect of fluid energy milling on the silica fume is to reduce the size of the silica fume. The graph for the milled silica fume will shift depending on the graph for the unmilled silica fume. Because the reduction in the size of the silica fume from unmilled to milled is relative and not absolute it is important that the technique used to measure the unmilled silica fume also be employed to measure the milled silica fume. Employing the same technique reduces errors which occur between different techniques.

It should be realized that in preparation of a sample for testing if the unmilled silica fume is subject to a prolonged very high rate of shear that the unmilled fume will become milled fume due to the shear in sample preparation and the results will show very little difference between milled silica fume and unmilled silica fume. This should be taken into consideration with respect to preparation of samples.

Another convenient way to distinguish unmilled from milled silica fume for use in accordance with the present invention is to measure the mean particle size of both the unmilled and milled silica fume using any conventional method. It is preferred that the mean particle size reduction between unmilled and milled silica fume be about 10%, more preferred about 15% and good results are found with about 20% reduction. For example, a mean particle size reduction of about 10% occurs when the mean particle size of unmilled silica fume is about 0.7 microns and the mean particle size of the milled particle size is about 0.6 to about 0.65 microns (10% of 0.7).

Yet another convenient way to distinguish unmilled from milled silica fume for use in accordance with the present invention is the increase in weight percent of the silica fume which is less than about 1 micron in size. Suitable silica fume for use in accordance with the present invention has an increase in weight percent of silica fume less than about 1 micron in size of about 10%, more preferably about 15% and good results have been found with an increase of about 20%. For example, typical unmilled silica fume for use in accordance with the present invention has about 73% by weight silica fume having a size less than about 1 micron while the typical milled silica fume has about 83% by weight silica fume less than about 1 micron in size. This weight increase is about 10% (73% +10% =83%).

Another method for distinguishing the milled from the unmilled silica fume for use in accordance with the present invention is the U.S. Sieve Series (ASTM-E-11-81). Using a No. 325 sieve which correspond to the Tyler equivalent designation of 325 mesh the unmilled silica fume after classification will typically have about 3% by weight of silica fume unable to pass through a 325 mesh while the milled silica fume should have not more than about 0.5% by weight of silica fume unable to pass through a 325 mesh and preferably not more than about 0.1% by weight of silica fume unable to pass through a 325 mesh screen.

In accordance with the present invention, milled silica fume is combined with a thermoplastic resin to make a thermoplastic resin composition from which an artifact is produced. A preferred formulation for a thermoplastic resin composition in accordance with the present invention contains about 100 phr (parts by weight based on 100 parts resin) resin, up to about 4 phr stabilizer, up to about 5 phr lubricant both external and internal combined, up to about 12 phr pigment such as titanium dioxide; up to about 100 phr of a filler such as calcium carbonate and about 0.5 to 40 phr of milled silica fume. For good impact results, about 1 to about 5 phr of milled silica fume is added to a resin composition. For good moduli of elasticity in an artifact produced with a resin composition in accordance with the present invention, about 10 to about 20 phr milled silica fume is used. For good extruder output rate increases are found with an addition of about 1 to about 20 phr milled silica fume.

The mixing of the components of the present invention is accomplished in a conventional manner. Also the extrusion of pipe or other artifacts in accordance with the present invention is accomplished in a conventional manner.

Each manufacturer of extruded sewer, telephone and electrical power and communication conduit has its own practical formulation for thermoplastic resin extrusion compositions and the amount of calcium carbonate filler, lubricants, stabilizers, pigments and impact strength modifiers in the formulation will vary within conventional known proportions.

Although the disclosure has been directed to thermoplastic resin compositions, it is within the scope of the present invention to add the milled silica fume to a cementitious material. Cemetitious materials include cement, mortar and concrete. It is also within the scope of this invention to use milled silica fume in a refractory material. Refractory materials are non-metallic materials which are suitable for withstanding the conditions in a furnace such as high temperature.

The components and the amounts of each component used in cementitious materials, except for the milled silica fume are conventional. Typically, concrete made in accordance with the present invention would have about 100 to 300 phc of sand (phc means parts by weight based on 100 parts of cement), about 100 to 500 phc of crushed stone, about 0.5 to 40 phc of milled silica fume, about 20 to 80 phc of water and about 0.5 to 20% by weight based on the weight of milled silica fume of a conventional additive. Examples of conventional additives for cement, mortar, grout and cementitious materials are water reducing agents, accelerators, retarders, plasticizers, air entraining agents, air de-entraining agents and antibleeding agents. A typical mortar composition made in accordance with the present invention would have about 200-400 phc of sand, about 0.5 to 40 phc milled silica fume, about 20 to 80 phc of water and about 0.5 to 20% by weight based on the weight of milled silica fume of a conventional additive. A typical cement mixture made in accordance with the present invention would have about 0.5 to 40 phc of milled silica fume, about 20 to 80 phc water and about 0.5 to 20% by weight based on the weight of milled silica fume.

The components and the amount of components save milled silica fume used in a refractory are conventional. Typically, refractory made in accordance with the present invention would have about 200-600 phc of clay, 0.5-60 phc milled silica fume and about 0.5 to 20% by weight based on the weight of the milled silica fume of a conventional additive. Clays, for example include silica fireclay and magnesium dolomite.

The following examples further illustrate this invention.

EXAMPLE 1

This example illustrates milling silica fume both precoated and uncoated in accordance with the present invention. Specifically, a Trost Air Impact Pulverizer, Model T-15 manufactured by Garlock, Inc. was used to prepare 5 milled samples of silica fume. The 5 milled samples were:

TABLE I

| Sample | Precoating Material |
| --- | --- |
| 1-A | 1% wt. Butyl Stearate |
| 1-B | 1% wt. silicone oil (350 cS) |
| 1-C | Uncoated |
| 1-D | 0.5% wt. hexamethyldisilazane |
| 1-E | 8% Plastiflow CW-2 (Associated Lead) pre-mixed at up to 80° C. with the microsilica in a high-speed mixer |

Samples 1-A, 1-B, 1-D and 1-E were pretreated prior to milling with the coating material listed in Table I above in a conventional drum mill for 20 minutes. The amount of coating material used is a weight percent based on the weight of uncoated silica fume.

The silica fume was fed to the mill by a K-Tron twin-screw volumetric feeder at 25-28 lb/hr. The total air flow to the mill was 100 scfm (standard cubic feet per minute), compressed to 100 psig. The product stream was passed to a 7×5 ft. Dacron filter bag where the milled silica fume was removed from the air stream. The feed, unmilled silica fume, had 1.8 to 2.1% by weight of particles unable to pass through a 325 mesh screen and the product, milled silica fume, had about 0.05 to 0.1% by weight unable to pass through a 325 mesh screen as measured with a 325 mesh screen in accordance with ASTM-E-11-81. There was virtually no increase in surface area between the unmilled feed and the milled product.

A satisfactory milled silica fume product made in accordance with this invention was obtained.

EXAMPLE 2

This example illustrates in situ coating of silica fume milled in accordance with the present invention. Two different mills were used and both gave satisfactory results. The operating parameters and results from the two mills are as follows:

TABLE II

| Parameter/Results | Mill A | Mill B |
| --- | --- | --- |
| Feed Rate Silica Fume to Mill (lb/hr) | 150-180 | 700 |
| Air flow rate (Scfm) | 400 | 1040 |
| Air Pressure (psig) | 100 | 100 |
| Percent Coating liquid (% wt. unmilled Silica fume) | 1% | 0.5% |
| Feed Size Silica fume (>325 mesh)(unmilled) | 1.5-2.7% | 2.4-4.9% |
| Product Size Silica fume (>325 mesh)(milled) | 0.07-0.4% | 0.0-0.15% |
| Feed Particle Size Mean (nanometers) | 800 | 500-700 |
| Product Particle Size Mean (nanometers) | 680 | 400-600 |

Mill A was a Trost Air Impact Pulverizer Model T-30 manufactured by Garlock Inc. and fitted with a K-Tron twin-screw volumetric feeder which fed silica fume into the feed inlet of the mill in a conventional manner. Mill B was a 24 inch Micro-Jet obtained from Fluid Energy Processing and Equipment Company which was fitted with an Acrison volumetric dry solid feeder which fed silica fume to the inlet venturi on the Micro-Jet.

A conventional bag house was used to collect the product.

In both mills silicone oil, polydimethylsiloxane, having a viscosity of 350 cS, was fed into the inlet stream by means of a high pressure metering pump. The pump was used to adjust the amount of coating material fed to the mill. The amount of coating material metered in was a weight percent based on the weight of the silica fume feed to the mill. In both mills the coating liquid entered the inlet air stream ahead of the silica fume with respect to the direction of movement of the air streams.

Feed and product size of the silica fume was measured in accordance with ASTM-E-11-81 using a 325 mesh screen. The percentage is the amount of silica fume unable to pass through a 325 mesh screen.

The average particle size for both the feed and the product was measured with an Horiba model CAPA-500 centrifugal particle size distribution analyzer and the samples were dispersed in 96% ethanol.

Mill A gave about 15% reduction in mean particle size and had an unmilled feed of about 3% by weight of silica fume unable to pass through a 325 mesh while the milled silica fume product had not more than about 0.5% by weight silica fume unable to pass through a 325 mesh.

Mill B gave about 20% reduction in mean particle size and had an unmilled feed of about 3% by weight silica fume unable to pass through a 325 mesh while the milled silica fume product had about 0.1% by weight silica unable to pass through a 325 mesh.

The milled product from both Mill A and Mill B produced milled silica fume in accordance with the present invention.

EXAMPLE 3

This example illustrates the superior results obtained when silica fume is used in the manufacture of telephone conduit in accordance with the present invention. Specifically, this example illustrates the increased elastic modulus of the product pipe, the decreased wall thickness of the product pipe, the cost savings and increased impact strength obtained with pipe made in accordance with the present invention.

Four pipe formulations were tested. Compositions 3B and 3D contained milled silica fume. The other two formulations were made up for comparative purposes. All pipes had an outside diameter of 4.35 inches.

The formulation for each pipe along with various test results, are given in Table III below and the amount of each component in the formulation is based on 100 parts by weight resin.

TABLE III

| | Parts by Weight | | | |
|---|---|---|---|---|
| | Conventional 3A | Present Invention 3B | Conventional 3C | Present Invention 3D |
| Component/Formula | | | | |
| PVC | 100 | 100 | 100 | 100 |
| Tin Stabilizer | 0.5 | 0.5 | 0.63 | 0.67 |
| Calcium Stearate | — | 1.0 | 0.7 | 1.2 |
| XL165 Wax | — | 1.3 | 1.33 | 1.33 |
| AC629A Wax | 0.1 | 0.2 | 0.2 | 0.1 |
| TiO2 pigment | 1.0 | 1.0 | 1.0 | 1.0 |
| S-Wax-3 | 1.15 | — | — | — |
| C-Wax | 0.9 | — | — | — |
| Resin 18-210 | — | — | 2.25 | — |
| CaCO3 (2 μm) | — | — | 8.0 | 20.0 |
| CaCO3 (3 μm) | 20.0 | 20.0 | — | — |
| Silica Fume milled | — | 10.0 | — | 10.0 |
| Results | | | | |
| Elastic Modulus: | | | | |
| psi | 477,000 | 603,000 | 440,000 | 564,000 |
| GPa | 3.277 | 4.143 | 3.023 | 3.875 |
| Wall Thickness: required to give a pipe stiffness of 120 psi inches | 0.165 | 0.153 | 0.169 | 0.156 |
| Impact Strength: | | | | |
| 73° F. (ft. lb) | 100 | >220 | — | — |
| 32° F. (ft. lb) | 50 | >220 | — | — |

The formulations in Table III above are based on 100 parts of PVC. The PVC used in this example is the suspension type and extrusion grade commercially available in the market today. In formulations 3A and 3B the thermal stabilizer, tin stabilizer was CC7711 sold by Cardinal Chemicals while formulations 3C and 3D used Argus 1034 sold by Argus Chemicals. Calcium stearate, XL165 Wax, AC629A Wax, S-Wax-3, C-Wax and Resin 18-210 are all conventional lubricants or additives. XL165 is a paraffin wax sold by American Hoechst Corp. AC629A is an oxidized polyethylene wax sold by Allied Chemical Corporation. Resin 18-210 is sold by Amoco Chemical Corp. C-Wax and S-Wax-3 are sold by Cardinal Chemicals. The calcium stearate was a commercial grade readily available in the market. The titanium dioxide, $TiO_2$, was PVC grade. Titanium dioxide is a pigment which is commercially available on the market. The calcium carbonate, $CaCO_3$, was a conventional filler and was a commercial grade readily available on the market. The respective average ground sizes of the calcium carbonate, 2 and 3 microns, are listed in Table III. The milled silica fume used in this example was from Example 2, Mill B.

Conventional mixing procedures were used in forming all of the formulations in Table III. The PVC powder and stabilizer were mixed in a high-speed mixer until the temperature reached 70° C. and then the lubricants were added and mixing continued to 100° C. The fillers and titanium dioxide were added and mixed to 120° C. The hot dry blend was cooled in a water-jacketed stirred cooler of conventional design to below 40° C.

Formulas 3A and 3B were extruded using conventional extrusion techniques with a Cincinnati Milacron CM-111 twin-screw extruder fitted with Maplan screws and barrel. Formulas 3C and 3D were extruded in a conventional manner using an NRM Pacemaker III single-screw extruder.

Each pipe was tested to determine the elastic modulus according to standard ASTM technique using the parallel plate load method of ASTM D-2412 and the elastic modulus was calculated from the equation given in Appendix X2 of ASTM D-2412. Table III lists the results obtained from such tests. It is clear that pipe made in accordance with this present invention provided higher moduli of elasticity than conventional pipe.

Telephone conduit is required to have a pipe stiffness as defined in ASTM D-2412 of at least 120 psi and according to ASTM D-2444 an impact resistance of 100 ft.lb at 73° F. and an impact resistance of 50 ft.lb at 32° F. These results illustrate the decreased wall thickness of pipe made in accordance with the present invention as compared to conventional pipe. This decreased wall thickness leads to substantial cost savings because less material is needed to make the pipe.

Pipe made from formula 3B and having a wall thickness of 0.153 inches gave an impact strength greater than 220 ft.lb at both 73° F. and 32° F. when measured in accordance with ASTM D-2444. Thus, even with the decreased wall thickness and relatively high filler content, the pipe made in accordance with the present invention had increased impact strength.

It is readily apparent from Table III that formulas 3B and 3D of the present invention gave superior overall results as compared to conventional formulas 3A and 3C. It is also apparent from a comparison of formulas 3C and 3D in Table III that the amount of filler used in the formulation of the conduit can be increased without having a deleterious effect on the elastic modulus. This also provides cost savings.

EXAMPLE 4

This example illustrates the increased output rate for an extruder using the present invention. Four-inch diameter electrical conduit made in accordance with UL specification was extruded from a Cincinnati Milacron CM-111 Twin-Screw Extruder. The formulations and output rate are listed in Table IV below and the amount of each component in the formulation is based on 100 parts by weight of resin:

TABLE IV

| | Parts by Weight | | | |
|---|---|---|---|---|
| | Conventional 4-A1 | Present Invention 4-A2 | Conventional 4-B1 | Present Invention 4-B2 |
| Formulations | | | | |
| PVC | 100 | 100 | 100 | 100 |
| Tin stabilizer | 0.3 | 0.3 | 0.3 | 0.3 |
| Calcium stearate | 0.65 | 0.65 | 0.8 | 0.8 |
| XL165 wax | 1.0 | 1.0 | 1.1 | 1.1 |
| AC629A wax | 0.1 | 0.1 | 0.1 | 0.1 |
| Titanium dioxide | 1.0 | 1.0 | 1.0 | 1.0 |
| $CaCO_3$ (3 μm) | 14 | 14 | — | — |
| $CaCO_3$ (2 μm) | — | — | 21 | 21 |
| Silica fume milled | — | 5 | — | 10 |
| Output Rates | | | | |
| Output rate (kg/h) | 318 | 343 | 327 | 363 |
| Specific gravity | 1.487 | 1.507 | 1.523 | 1.559 |
| Increase in output rate: | | A2/A1 | | B2/B1 |
| Weight Basis | | 7.9% | | 11.1% |
| Volume Basis | | 6.4% | | 8.4% |

The formulations are based on 100 parts PVC. The PVC was the mass polymerized type and of conventional pipe extrusion grade. The tin stabilizer was CC7711, the same as used in Example 3. The calcium stearate was commercial grade readily available in the market. XL165 wax and AC629A wax are the same as disclosed in Example 3. The titanium dioxide and calcium carbonate are the same as disclosed in Example 3. The milled silica fume was from Example 2 Mill B.

The PVC powder and stabilizer were mixed in a conventional high speed mixer at 70° C. and the calcium stearate and waxes were then added and mixed to 100° C. Titanium dioxide and fillers were added and mixed to 115° C. The blend was then cooled to 40° C. in a water-jacketed cooler. PVC pipes were extruded in conventional manner from the CM-111.

These results clearly illustrate that the present invention gave increases in both weight and volumetric output rates thus decreasing the overall time for making such pipe. This provides a cost saving to the manufacturer.

EXAMPLE 5

This example also illustrates the output rate of pipe made in accordance with the present invention. This example differs from Example 4 above in that both a different extruder and a different formulation is used for comparison purposes. Power and communication conduit Type DB60 with a diameter of 5 inches was extruded using a Cincinnati-Milacron CM-80 Twin-Screw Extruder. The extruded pipe had the formulations and output rates shown in Table V below. The amount of each component in the formulation is based on 100 parts by weight of resin.

TABLE V

| | Parts by Weight | |
|---|---|---|
| Formulations | Conventional 5-A1 | Present Invention 5-A2 |
| PVC | 100 | 100 |
| LS203 | 2.3 | 2.3 |
| Calcium stearate | 0.15 | 0.15 |
| Resin 18-210 | 2.73 | — |
| Chlorinated polyethylene | 1.21 | — |
| $TiO_2$ | 1.0 | 1.0 |
| $CaCO_3$ (2 μm) | 30 | 30 |
| Silica fume milled | — | 10 |
| Output Rates | 7-A1 | 7-A2 |
| Output rate (kg/h) | 391 | 475 |
| Specific gravity | 1.544 | 1.576 |
| Increase in output rate: | | A2/A1 |
| Weight Basis | | 21.5% |
| Volume Basis | | 19.0% |

These formulations are based on 100 parts PVC. The PVC used in this example is the same type as was used in Example 3. LS203 is a thermal stabilizer and lubricant sold by Carstab Co. The calcium stearate was a commercial grade, readily available on the market. Resin 18-210 was the same as used in Example 3. Chlorinated polyethylene is an impact modifier supplied by the Dow Chemical Company and readily available in the market. Titanium dioxide was PVC grade which is readily available in the market. Calcium carbonate was a commercial grade of 2 microns and is readily available in the market. The milled silica fume was obtained from Example 2 Mill B above.

The mixing procedure of Example 4 was followed. The pipes were then extruded in conventional manner with the CM-80 extruder.

It is clear from this example that increased output rates are obtained using pipe made in accordance with the present invention.

EXAMPLE 6

This example illustrates the improved impact strength achieved using the present invention compared to unmilled silica fume in extruded PVC conduit. Pipes were extruded with the formula listed in Table VI below. The amount of each component in the formulation is based on 100 parts by weight resin. The type of silica fume used is listed in Table VII below. It is clear that superior results are obtained with the present invention.

TABLE VI

| General Formulation | Parts by Weight |
|---|---|
| PVC | 100 |
| Lead stabilizer + lubricants | 2.0 |
| Stearic Acid | 0.4 |

TABLE VI-continued

| General Formulation | Parts by Weight |
| --- | --- |
| Diphenyl Isodecyl Phosphite | 0.2 |
| TiO$_2$ | 1.0 |
| CaCO$_3$ (5µ) | 10.0 |
| Silica Fume | 5 |

TABLE VII

| Sample | Coating | Pipe Impact Strength (kg. m) Unmilled | Milled |
| --- | --- | --- | --- |
| 6A | None - Control No silica fume | 18.03 | |
| 6B | None | 24.04 | |
| 6C | None | | >36.06 |
| 6D | 8% Plastiflow, CW-2 | 15.06 | |
| 6E | 8% Plastiflow, CW-2 | | 27.6 |
| 6F | 0.5% hexamethyl-disilazane | 20.4 | |
| 6G | 0.5% hexamethyl-disilazane | | 33.6 |
| 6H | 1% butyl stearate | 14.4 | |
| 6I | 1% butyl stearate | | >36.06 |
| 6J | 1% silicone oil | 10.8 | |
| 6K | 1% silicone oil | | 33.6 |

These formulations are based on 100 parts PVC. For each formulation the PVC used was the same as in Example 3. Lead stabilizer was a thermal stabilizer and a lubricant labeled SMS299 and sold by Barlocher Co. The stearic acid is a lubricant and was a commercial grade readily available in the market. The diphenyl isodecyl phosphite was a commercial grade sold by Borg-Warner Chemicals, Inc. The titanium dioxide was PVC grade, readily available on the market. The calcium carbonate had been ground to 5 microns and was of commercial grade, readily available in the market. In each sample 6A through 6J, 5 parts of silica fume was added. Sample 6A was a control, and shows the impact strength for a pipe containing no silica fume. Samples 6B and 6C show the impact strength of pipe made from uncoated unmilled and uncoated milled silica fume respectively. The coating materials are listed with weight percents based on the weight of silica fume. The silica fume was precoated before milling.

Plastiflow CW2 used for samples 6D and 6E is a lubricant sold by Associated Lead, Inc. To precoat the silica fume, 8% by weight, based on the weight of silica fume prior to coating, of Plastiflow CW2 was added to a high-speed mixer up to 80° C. and the silica fume and Plastiflow were mixed to thereby coat the fume. Part of this coated fume was used to make the precoated 8% Plastiflow CW2 unmilled pipe while a portion of this precoated fume was milled in accordance with the present invention to produce a precoated 8% Plastiflow CW2 milled silica fume which was subsequently used in the formulation and a pipe extruded therefrom.

The hexamethyldisilazane used in samples 6F and 6G was a commercial grade readily available in the market. The fume was precoated with 0.5% by weight based on the weight of silica fume in a conventional drum mill for 20 minutes. A portion of this precoated silica fume was then further milled in accordance with the present invention and a pipe made therewith.

Samples 6H and 6I were made from a silica fume precoated with 1% by weight based on the weight of silica fume before coating of butyl stearate. Butyl stearate was of a commercial grade readily available in the market. The silica fume was combined with the butyl stearate in a conventional drum mill and mixed for 20 minutes to accomplish the coating. A portion of this coated silica fume was subsequently subjected to a fluid energy mill in accordance with the present invention.

Samples 6J and 6K were made from silica fume which was pretreated with polydimethylsiloxane 350 cS silicone oil by mixing the oil and fume in a conventional drum mill for 20 minutes. Part of this precoated fume was subsequently milled in accordance with the present invention. The polydimethylsiloxane was of a commercial grade readily available in the market.

In order to mix the components, PVC powder, additives and fillers were added to a standard, high-speed, high intensity mixer at ambient temperature and mixed at high speed until a blend at a temperature of 120° C. was obtained. The hot blend was then dropped directly into a conventional water-jacketed drum cooler and mixed at low speed until the temperature was below 40° C. The blend was then fed into a Leistritz twin-screw Model HD-280 extruder and the pipe was extruded in a conventional manner such that the pipe had a nominal external diameter of 100 mm and a nominal wall thickness of 1.8 mm.

Impact resistance was measured with a tester comprising a 4.5-meter wooden arm, pivoted at one end and having a 6-kg steel weight at the other end. Directly in line with the pivoted point of the arm and below it is a rigid anvil constructed of steel and concrete. The anvil is positioned such that the axe-like weight strikes the flat back of the anvil with the edge of the weight vertical and parallel to this back face of the anvil. The striking edge of the axe-like weight is 7 cm long and has a radius of curvature of 1 cm.

To measure the impact resistance, the arm and the axe-like weight are raised by means of a rope and pulley to a position determined by a curved scale behind the arc described by the weight. This scale is calibrated to allow the force impacting upon the anvil to be determined in terms of kilogram-meters (kg.m).

A 30-cm length of the pipe to be tested is placed horizontally against and parallel to the back face of the anvil and its vertical position adjusted so that the striking edge of the impact weight strikes the pipe centrally.

Twenty samples of an extruded pipe are tested at an ambient temperature of 23±1° C. by the "up/down" or staircase method. The results are analyzed by the method described in ASTM D-2444, Appendix X3.

It is clear that pipe made in accordance with the present invention produces a superior result to pipe containing the unmilled silica fume coated or uncoated and the pipe containing no silica fume.

EXAMPLE 7

This example illustrates the use of the present invention to increase the impact resistance of conduits containing twice as much calcium carbonate as disclosed in Example 6 above. In this example pipe was made with the same general formula disclosed in Tables VI and VII above except that 20 parts of calcium carbonate was used rather than 10 parts as listed in Table VI. The silica fume used is listed below:

TABLE VIII

| Sample | Type Silica Fume | Impact Resistance (kg . m) |
| --- | --- | --- |
| 7A | No silica fume | 14.4 |
| 7B | Precoated 1% Silicone oil milled silica fume | 30.1 |

The silica fume used in Sample 7B was precoated in a conventional drum mill for 20 minutes by combining the silica fume and the 1% based on the weight of silica fume before milling. The silicone oil was polydimethylsiloxane 350 cS. This oil was of a commercial grade readily available in the market.

The mixing procedure as well as the extrusion and the measurement of the impact resistance were done as disclosed in Example 6 above.

A comparison of 7A with 6A shows that as the amount of calcium carbonate increases in the formulation in the absence of silica fume, the impact resistance decreases. Sample 6A had an impact resistance of 18.03 kg-m while 7A had an impact resistance of 14.4 kg-m. This is roughly a 20% drop in the impact strength when 10 more parts of calcium carbonate was added to the formulation. However, a much smaller decrease of strength is observed in the pipe made with milled silica fume in accordance with the present invention. A comparison of Sample 6K with 7B shows only about a 10% drop in the impact strength. This clearly demonstrates that the present invention helps reduce the loss of impact strength normally accompanied by an increase in the calcium carbonate. In other words, the expense to produce a pipe is decreased when silica fume milled in accordance with the present invention is used because the amount of calcium carbonate filler can be increased and the pipe still meets the impact requirements. The pipe made with increased calcium carbonate Sample 7B is still stronger than any of the samples made without unmilled silica fume.

Generally, calcium carbonate is not used in UPVC for these pipes in an amount greater than 10 phr because the brittleness of the finished product is unacceptable. Thus, it is truly surprising and unexpected that as much as 20 phr of calcium carbonate when added to the formulation produced a pipe with a greater impact resistance than pipe made with only 10 phr, or with pipe made with unmilled silica fume.

It will be understood that the preferred embodiments of the present invention herein chosen for the purpose of illustration are intended to cover all changes and modifications of the preferred embodiments of the present invention which do not constitute a departure from the spirit and scope of the present invention.

What is claimed is:

1. An artifact made from a thermoplastic resin composition said thermoplastic resin composition containing as an essential ingredient therein silica fume which has been subjected to a fluid energy milling process whereby unmilled silica fume is reduced in size to produce said silica fume.

2. The artifact of claim 1 wherein the milled silica fume is coated.

3. The artifact of claim 1 wherein the milled silica fume has had an overall size reduction of at least about 10% as compared to unmilled silica fume.

4. The artifact of claim 1 wherein no more than about 0.5% by weight of milled silica fume is unable to pass through a 325 mesh screen.

5. The artifact of claim 1 wherein the milled silica fume has had a mean particle size reduction of about 10% as compared to unmilled fume.

6. The artifact of claim 1 wherein the milled silica fume has had an increase in weight percent of silica fume less than about 1 micron of about 10% as compared to unmilled silica fume.

7. A thermoplastic resin composition suitable for extrusion of a conduit containing about 100 phr resin, up to about 4 phr thermal stabilizer, up to about 5 phr lubricant, up to about 12 phr pigment, up to about 100 phr filler and about 0.5 to 40 phr silica fume which has been subjected to a fluid energy milling process whereby unmilled silica fume is reduced in size to produce said silica fume.

8. A method for making an artifact from a thermoplastic resin composition comprising extruding a thermoplastic resin containing as an essential ingredient therein silica fume that has been subjected to a fluid energy milling process whereby unmilled silica fume is reduced in size to produce said silica fume.

9. The method of claim 8 wherein the milled silica fume is coated.

10. The method of claim 8 wherein the milled silica fume has had an overall size reduction of at least about 10%.

11. The method of claim 8 wherein the milled silica fume has no more than about 0.5% by weight of milled silica is unable to pass through a 325 mesh screen.

12. The artifact of claim 8 wherein the milled silica fume has had a mean particle size reduction of about 10% as compared to unmilled fume.

13. The artifact of claim 8 wherein the milled silica fume has had an increase in weight percent of silica fume less than about 1 micron of about 10% as compared to unmilled silica fume.

14. A method for making a conduit from a thermoplastic resin comprising extruding a composition containing about 100 phr of resin, up to about 4 phr thermal stabilizer, up to about 5 phr lubricant, up to about 12 phr pigment, up to about 100 phr filler and about 0.5 to 40 phr coated silica fume which has been subjected to a fluid energy milling process whereby unmilled silica fume is reduced in size to produce said silica fume.

15. A conduit made from a thermoplastic resin and containing as an essential ingredient therein silica fume which has been subjected to a fluid energy miling process whereby unmilled silica fume is reduced in size to produce said silica fume.

16. The conduit of claim 15 wherein the milled silica fume is coated.

17. The conduit of claim 15 wherein the milled silica fume has had an overall size reduction of at least about 10%.

18. The conduit of claim 15 wherein the milled silica fume is unable to pass through a 325 mesh screen.

19. The artifact of claim 15 wherein the milled silica fume has had a mean particle size reduction of about 10% as compared to unmilled fume.

20. The artifact of claim 15 wherein the milled silica fume has had an increase in weight percent of silica fume less than about 1 micron of about 10% as compared to unmilled silica fume.

21. A conduit made from a thermoplstic resin composition comprising about 100 phr of a thermoplastic resin, up to about 4 phr thermal stabilizer, up to about 5 phr lubricant, up to about 12 phr pigment, up to about 100 phr filler and about 0.5 to 40 phr coated silica fume which has been subjected to a fluid energy milling process whereby unmilled silica fume is reduced in size to produce said silica fume.

22. An artifact made from a thermoplastic resin composition, said thermoplastic resin composition containing as an essential ingredient therein silica fume which has been subject to a fluid energy milling process whereby said silica fume had an overall size reduction of at least about 10% as compared to non-reduced silica fume.

* * * * *